United States Patent [19]

Jocz

[11] 4,454,504
[45] Jun. 12, 1984

[54] TORQUE OVERLOAD INDICATOR

[75] Inventor: Armin E. Jocz, Ada, Mich.

[73] Assignee: Westran Corporation, Sparta, Mich.

[21] Appl. No.: 303,506

[22] Filed: Sep. 18, 1981

[51] Int. Cl.³ .............................................. G08B 21/00
[52] U.S. Cl. .................................. 340/665; 73/862.31; 340/679
[58] Field of Search ....................... 340/665, 688, 679; 73/862.31, 862.49, 862.23

[56] References Cited

U.S. PATENT DOCUMENTS 2,503,141  4/1950  Stone ................................... 340/668
4,182,168  1/1980  Desch ............................... 73/862.49

Primary Examiner—Glen R. Swann, III
Attorney, Agent, or Firm—Gifford, VanOphem, Sheridan, Sprinkle & Nabozny

[57] ABSTRACT

A device is provided for use with an actuator having an actuator shaft which indicates when the torque on the actuator shaft exceeds a predetermined limit. The device comprises a housing which carries a pair of limit switches. A shaft extension is operatively connected with the actuator shaft so that axial force on the actuator shaft, which is proportional to the shaft torque, is transmitted to the shaft extension. A hub and Belleville washer arrangement translates the axial force on a shaft into a proportional axial movement of the hub while a radially extending member from the hub includes a portion positioned adjacent the limit switch. Thus, when the axial force in one direction on the shaft exceeds a first predetermined amount, the radially extending member activates one limit switch which in turn is connected to an indicator. Similarly, when the axial force in the other direction on the shaft exceeds a second predetermined amount, the radially extending member activates the other limit switch which is also connected to the indicator. An adjustable cam is secured to the radially extending member to vary the torque limit at which the limit switch is activated.

12 Claims, 5 Drawing Figures

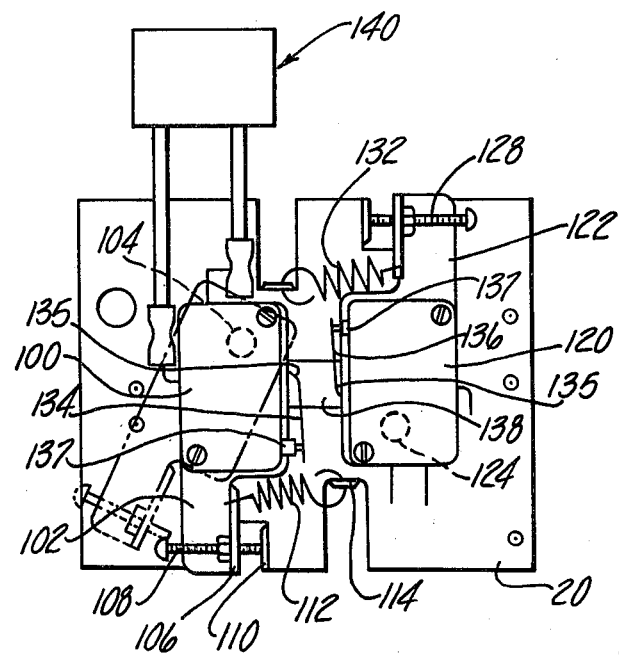
Fig-2
Fig-3
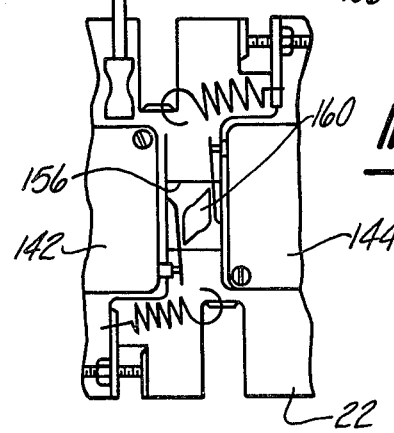
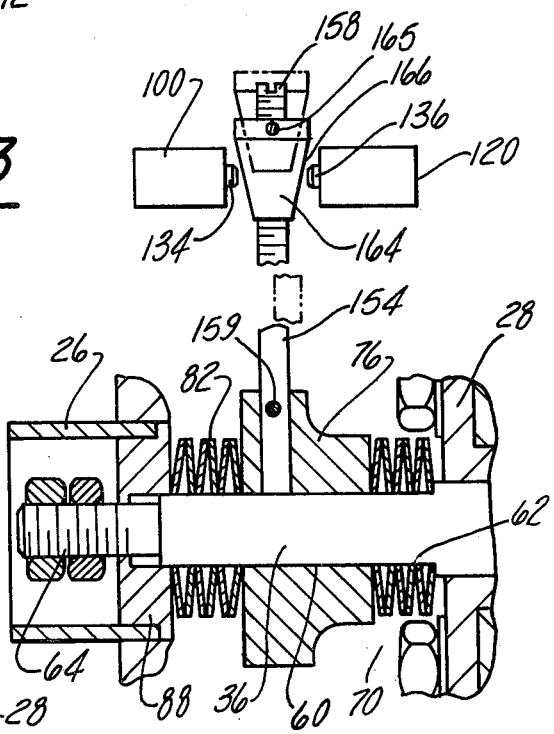
Fig-4
Fig-5

TORQUE OVERLOAD INDICATOR

BACKGROUND OF THE INVENTION

Field of the Invention

The present invention relates generally to indicating devices and, more particularly, to a device for indicating when the torque on a shaft exceeds a predetermined limit.

Description of the Prior Art

Many types of valve actuators include an actuator shaft which is rotatably motor driven in one direction to open the valve and in the opposite direction to close the valve. Furthermore, the actuator shaft is subjected to relatively high torque loads when the valve reaches or is initially moved from either its open or closed position. In the event of valve malfunction, however, the actuator shaft can be subjected to excessive torque loads which can damage the valve components including the valve motor.

There have been a number of previously known devices designed to measure the torque on the actuator shaft to deactivate the valve motor when the torque exceeds a predetermined limit. These previously known devices, however, have not proven wholly satisfactory in use.

One disadvantage of these previously known devices is that they are complex and unreliable in operation. Consequently, these previously known torque limiting devices frequently fail to deactivate the valve motor despite a torque overload thus damaging the valve components.

A still further disadvantage of many of the previously known devices for deactivating the actuator motor at a predetermined torque overload is that the torque limit at which the valve motor is deactivated is not adjustable by the ultimate user but rather is preset at the place of manufacture. In addition, it is conventional to set the torque overload limits just below the maximum permissible limits. Many valves, however, slowly deteriorate during extended operation and the maximum torque applied to the valve actuator shaft also gradually increases with the deterioration of the valve. Finally, the maximum permissible torque is exceeded and at this time, the valve essentially is rendered inoperable. Immediate repair or replacement of the valve is then required before the operation of the fluid system can continue. In many circumstances, however, the immediate replacement or repair of the valve is either impractical or impossible thus resulting in prolonged downtime of the fluid system.

SUMMARY OF THE PRESENT INVENTION

The present invention overcomes the above-mentioned disadvantages by providing a device for use with an actuator, such as a valve actuator, which activates an alarm or other indicator when the torque on the actuator shaft exceeds a predetermined torque limit. This torque limit, however, is less than the maximum permissible torque limit for the valve actuator and is adjustable by the ultimate end user of the valve.

In brief, the device according to the present invention comprises a shaft extension which is coaxial with the actuator shaft and coupled to the actuator shaft by thrust bearings. The thrust bearings cause the shaft extension to move axially with the actuator shaft but without the rotation of the actuator shaft.

A device housing is secured to the housing for the valve actuator and the shaft extension either extends through or adjacent the device housing. At least one and preferably two limit switches are mounted to the device housing.

The axial force, i.e., either compression or tension, of the valve actuator shaft is proportional to the torque applied to the actuator shaft. This axial force, in turn, is transmitted to the shaft extension and means carried on the shaft extension translate this axial force to a proportional axial movement. In the preferred form of the invention, this translating means comprises a hub sandwiched in between two Belleville washer clusters. The outside axial end of each cluster is entrapped between both the device housing and a member or abutment surface carried by the shaft extension. Thus, an axial force on the shaft extension is translated into a proportional axial movement of the hub.

A rod is secured to the hub so that the rod extends radially outwardly from the shaft extension and the rod includes a portion positioned adjacent the limit switch or switches. Thus, axial movement of the hub moves the rod axially with respect to the axis of the shaft extension and activates the limit switch whenever axial displacement of the hub extension exceeds a predetermined limit. The limit switch in turn is electrically connected to an alarm or other indicator to indicate to the operator that the torque applied to the actuator shaft has exceeded a predetermined limit.

In the preferred form of the invention, a cam member is adjustably secured to the rod portion so that the torque maximum at which the limit switches are activated can be adjusted by the user. Preferably, the cam can be adjusted to activate the limit switches when the torque applied to the actuator shaft is in the range from 30% to 100% of the maximum torque rating of the valve.

A second pair of limit switches are also mounted within the device housing adjacent the rod. A fixed cam on the rod selectively activates these second limit switches when the torque on the actuator shaft exceeds the maximum torque rating of the valve actuator. This second pair of switches is preferably coupled to the valve motor to deactivate the valve motor when activated to prevent damage to the valve actuator components and the torque setting is not adjustable by the end user.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 2 is a view taken substantially along line 2—2 in FIG. 1;

FIG. 3 is a view taken substantially along line 3—3 in FIG. 1;

FIG. 4 is a longitudinal sectional view similar to FIG. 1 but with parts removed and illustrating the operation of the preferred embodiment of the device of the present invention; and FIG. 5 is a view similar to FIG. 4 but illustrating a different operation of the present invention.

DETAILED DESCRIPTION OF A PREFERRED EMBODIMENT OF THE PRESENT INVENTION

Figure 1:
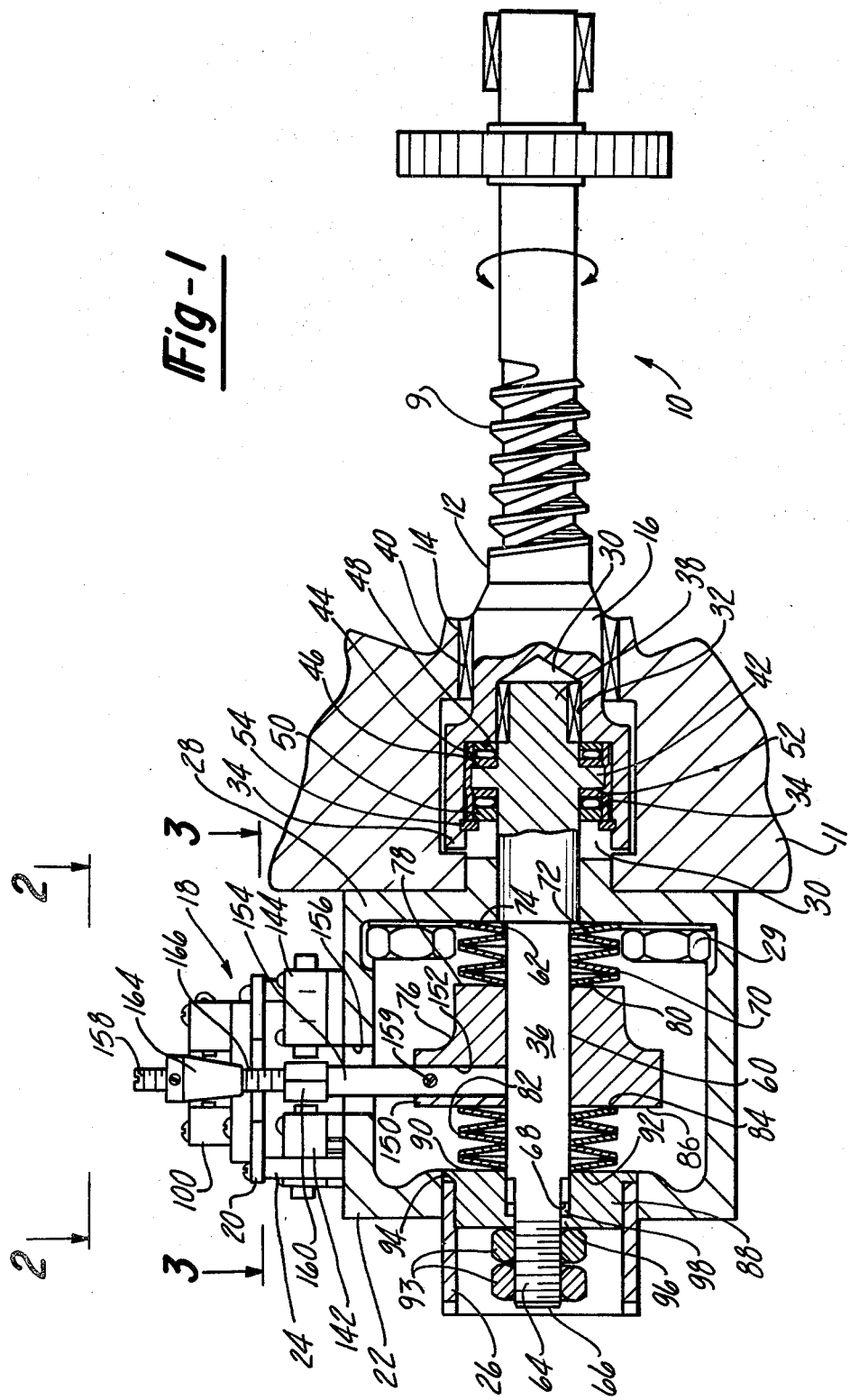
FIG. 1 is a partial longitudinal sectional view illustrating the preferred embodiment of the invention.

With reference first to FIG. 1, an actuator 10 is thereshown, such as a valve actuator, having an actuator shaft 12 rotatably mounted to an actuator housing 11 by a bearing assembly 14. Both the actuator 10 and actuator shaft 12 are conventional in construction so that only a brief description of the actuator 10 and its shaft 12 will be necessary.

In brief, the actuator shaft 12 is rotatably driven by conventional means, such as an electric motor, in one rotational direction to move the valve from its open and to its closed position. Conversely, rotation of the actuator shaft 12 in the opposite direction moves the valve from its closed and to its open position. The actuator shaft 12 due to the engagement between the actuator shaft threads 9 and its driven gear (not shown) is substantially constrained against axial movement with respect to its housing 11. However, as the torque on the actuator shaft 12 increases, an axial force is imposed upon the actuator shaft 12 which is directly proportional to the shaft torque. The direction of this axial force depends upon the direction of the torque, i.e., whether the torque is applied in a clockwise or counterclockwise direction. In addition, this axial force axially displaces the end 16 of the shaft 12. A small clearance space, for example 80/1000 of an inch, is typically provided between the actuator shaft 12 and bearing assembly 14 to permit this axial movement.

Still referring to FIG. 1, the device according to the present invention comprises a housing 18 having an upper plate 20 and a center plate 22. Spacer pins 24 extend between these plates 20 and 22 to retain the plates 20 and 22 in a spaced apart and generally parallel position relative to each other. The housing 18 further includes a collar 26 and a front wall 28 which is fixedly secured against movement to the housing 11 in any conventional fashion, such as a bolt 29.

The end 16 of the actuator shaft 12 is outwardly flared thus forming an axial recess 30 in the shaft end 16. A first cylindrical surface 32 and a second cylindrical surface 34 are formed within this axial recess 30 so that the surface 32 has a diameter less than the surface 34. An annular abutment surface 48 is formed at the intersection of these two surfaces 32 and 34.

A shaft extension 36 having a reduced diameter portion 38 at one end extends coaxially outwardly from the the actuator shaft 12 and a bearing assembly 40 is mounted between the reduced diameter portion 38 and the cylindrical surface 32 in the shaft recess 30. The bearing assembly 40 enables the shaft extension 36 to remain stationary against rotation despite rotation of the actuator shaft 12.

Still referring to FIG. 1, the shaft extension 36 includes an outwardly extending cylindrical flange 42 adjacent its reduced diameter end 38. A first thrust bearing 44 is entrapped between one side 46 of the flange 42 and the annular abutment surface 48 in the actuator shaft recess 30. Similarly, a secnd thrust bearing 50 is entrapped between the other side 52 of the flange 42 and a retainer ring 54 which is secured to the actuator shaft 12. In addition, the flange 42 is dimensioned to eliminate all axial movement between the actuator shaft 12 and the shaft extension 36. Thus, the thrust bearings 50 and 44 together with the bearing assembly 40 serve to transmit axial motion, but not rotational motion, of the actuator shaft 12 to the shaft extension 36.

The shaft extension 36 includes a central reduced diameter portion 60 thus forming an annular abutment surface 62 in line with the front wall 28 of the device housing 18. A further reduced diameter portion 64 is formed at the free end 66 of the shaft extension 36 thus forming a second annular abutment surface 68 on the shaft extension 36.

A first cluster of Belleville washers 70 are slidably mounted on the shaft extension central portion 60 so that one end 72 of the clusters simultaneously abuts against the shaft extension annular abutment surface 62 and the inside 74 of the housing front wall 28. An annular hub 76 is then slidably mounted on the shaft extension portion 60 so that one end 78 of the hub 76 abuts against the other axial end 80 of the Belleville washer cluster 70.

A second Belleville washer cluster 82 is also slidably mounted on the shaft extension central portion 60 so that one end 84 of the cluster 82 abuts against the other end 86 of the hub 76. An annular ring 88 is then slidably mounted to the shaft extension 36 so that one end 90 of the ring flatly abuts against the other end 92 of the Belleville washer cluster 82. This ring 88 is locked to the shaft extension 36 against axially outward movement and vibration by lock nuts 93.

The ring 88 includes an outwardly extending portion 94 which abuts against the collar 26 of the device housing 18. The abutment between the housing 18 and the ring portion 94 thus prevents the axially outward movement of the ring 88 with respect to the housing 18. The ring 88 also includes an inwardly extending annular portion 96 and a clearance space 98 is formed between this ring portion 96 and the annular abutment surface 68 on the shaft extension 36 for a reason to be subsequently described.

With reference now particularly to FIG. 2, a first limit switch 100 is mounted to a switch plate 102 which in turn is pivotally mounted to the upper housing plate 20 by a pivot pin 104. Thus, the switch plate 102 with its attached switch 100 can pivot from the position shown in solid line and to the position shown in phantom line for a reason to be subsequently described. The switch plate 102 includes an upwardly extending tab 106 at its end spaced from the pivot pin 104. An adjustment screw 108 is secured to this tab 106 and abuts a tab 110 on the upper housing plate 20. In addition, a tension spring 112 is disposed between the switch plate tab 106 and a further tab 114 on the housing plate 20 which urged the limit switch 100 to the position shown in solid line.

A second limit switch 120 is also secured to a switch plate 122 which is pivotally mounted by a pivot pin 124 to the housing upper plate 20. Thus, the second switch 120 is also pivotal in a fashion similar to the switch 100. An adjustment screw 128 limits the pivotal movement of the switch 120 while a tension spring 132 urges the switch plate 122 with its attached switch to the position shown in FIG. 2.

The switches 100 and 120 each have an activation lever 134 and 136, respectively, which face each other. Moreover, both activating levers 134 and 136 have a portion which extends above an opening 138 formed in the upper housing plate 20. The switches 100 and 120 are connected to an indicator means 140 which generates a signal when either the switch 100 or 120 is activated. In the preferred form of the invention, once the indicator means 140 is activated, it continues to generate a signal until reset by the operator.

With reference now to FIG. 3, a second pair of limit switches 142 and 144 are secured to the middle plate 22 of the device housing 18. The switches 142 and 144 are substantially identical in construction to the limit switches 100 and 120. In addition, the switches 142 and 144 are attached to the middle housing plate 22 in substantially the same fashion as the attachment of the switches 100 and 120 to the upper housing plate 20 and, therefore, will not be further described. Both switches 142 and 144, however, are connected to a deactivating means 146 which deactivates the valve actuator motor when the torque on the actuator shaft exceeds a predetermined amount as will become shortly apparent.

With reference again to FIG. 1, the hub 76 includes an outwardly extending boss 150 having a bore 152 which is substantially radial with respect to the axis of the shaft extension 36. A rod 154 is positioned within the hub bore 152 so that the rod 154 extends through an opening 156 in the housing middle plate 22 and has an upper portion 158 which protrudes upwardly and through the opening 138 (FIG. 2) in the upper housing plate 20. This rod 154 is secured to the hub 76 by a set screw 159.

A first cam 160 (FIGS. 1 and 3) is secured to the rod 154 so that the cam 160 is in line with the lower switches 142 and 144. Thus, as the rod 154 shifts axially outwardly with respect to the axis of the shaft extension 36, the cam 160 contacts and activates the switch 142. Conversely, axial movement of the rod 154 in the opposite direction causes the cam 160 to contact and activate the other switch 144. The amount of axial movement with respect to the axis of the shaft extension necessary to activate the switches 142 and 144 can be varied by the rotation of the rod 154 and, once set, the rod 154 is locked to the hub 76 by the set screw 159.

With reference now particularly to FIG. 4, a barrel cam 164 is threadably secured to the upper portion 158 of the rod 154 and has a frusto-conical tapered surface 166 positioned in between the switch levers 134 and 136 (FIG. 3) of the limit switches 100 and 120, respectively. The barrel cam 164 is adjustable from the position shown in solid line and to the position shown in phantom line and, in doing so, varies the amount of lateral movement of the rod 154, corresponding to axial movement of the shaft extension 36, necessary to activate the limit switches 100 and 120. A set screw 165, upon tightening, locks the barrel cam 164 in its adjusted position.

With reference now to FIG. 4, the operation of the device according to the present invention will now be described. Assume first that torque is applied to the actuator shaft 12 in a direction so that the end of the actuator shaft 16 is in a state of compression. When compressed, the actuator shaft 12 moves slightly axially outwardly toward the shaft extension 36 and this axial movement is transmitted via the thrust bearings 44 and 50 to the shaft extension 36.

Despite the outward axial movement of the shaft extension 36, the ring 88 remains stationary due to its abutment with the collar 26. The abutment surface 62 on the shaft extension 36, however, causes the Belleville washer clusters 70 and 82 to compress between the ring 88 and the abutment surface 62 on the shaft extension 36 thus moving the hub 76 axially outwardly with respect to the device housing 18. At this time, a small clearance space is formed between the Belleville washer cluster 70 and the front wall 28 of the housing 18 as well as between the lock nuts 93 and ring 88. The actual movement of the hub 76 is equal to one half the axial movement of the shaft extension 36 since the compression on the shaft extension 36, and thus the axial movement of the shaft extension 36, is evenly divided between the Belleville washer clusters 82 and 70.

The outward axial movement of the hub 76, in turn, moves the rod 154 with its attached barrel cam 164 toward the limit switch 100. When the rod 154 moves beyond a predetermined amount, the barrel cam 164 contacts and activates the switch 100 which, in turn, activates the indicator means 140. Similarly, the lateral movement of the rod greater than a second predetermined limit causes the fixed cam 160 to contact and activate the lower limit switch 142 thus deactivating the actuator motor by the deactivating circuit 146.

With reference now to FIG. 5, when the actuator shaft 12 is subjected to tension, this tension is translated to the shaft extension 36 via the thrust bearings 44 and 50 thus causing both actuator shaft 12 and shaft extension 36 to shift slightly rightwardly. Upon doing so, the ring 88 secured to the shaft by the lock nuts 93 compresses the Belleville washer clusters 70 and 82 against the inside 74 of the housing front wall 28 thus causing the hub 76 to move slightly rightwardly as viewed in FIG. 5. The rightward movement of the hub 76 is substantially one half the rightward movement of the shaft extension 36 since, as before, the compression on the shaft extension 36 is evenly divided between the Belleville washer clusters 82 and 70. At this time, a small clearance space is formed between the ring 88 and the collar 26 as well as between the washer cluster 70 and the abutment surface 62 on the shaft extension 36.

As the hub 76 shifts slightly rearwardly, the rod 154 with its attached barrel cam 164 and lower cam 160 respectively move towards the upper and lower limit switches 120 and 144. When the rightward movement of the rod 154 exceeds a predetermined amount, as determined by the position of the barrel cam 164 on the rod 154, the barrel cam 164 contacts and activates the limit switch 120 which, in turn, activates the indicator means 140. Likewise, when the rightward movement of the hub 76 exceeds a second and greater predetermined limit, the fixed cam 160 activates the lower limit switch 144. When the tension or compression on the actuator shaft 12 ends, the hub 76 with its attached rod returns to its neutral position as illustrated in FIG. 1.

From the foregoing, it can be seen that the shaft extension 36 with the ring 88, Belleville washer clusters 82 and 70, and hub 76 form a means for translating the axial force from the actuator shaft 12 into a proportional axial movement of the hub 76. The Belleville washer clusters 70 and 82 function to resist the axial movement of the shaft extension 36 so that the axial force on the shaft 12 is transmitted to the shaft extension 36. As previously described, the axial force on the actuator shaft 12 is proportional to the torque on the actuator shaft 12.

In a typical application, the lower limit switches 142 and 144 are operable to deactivate the actuator motor when the actuator shaft torque exceeds a predetermined torque limit. Furthermore, this limit is preset at the place of manufacture and represents the maximum permissible torque and the deactivation of the actuator motor is designed to prevent damage to the valve components.

In addition, it is the conventional practice to deactivate the actuator motor whenever the actuator shaft torque exceeds the same limit in either direction. Consequently, the cam 160 is centered inbetween and equidistantly spaced from the lower limit switches 142 and 144. In the event, however, that it is desirable to deactivate the actuator motor at one torque limit in one direction and at another torque limit in the other direction, the set screw 159 is simply loosened and the rod 154 is rotated slightly to simultaneously move the cam 160 closer to or further from the limit switches 142 and 144. The set screw 159 is then tightened to lock the cam 160 in its adjusted position. By varying the rotational position of the cam 160 in this fashion, the torque limit at which the motor is deactivated is different depending on the direction of the torque.

Conversely, the upper limit switches 100 and 120 in a typical application are not used to deactivate the actuator motor but instead activate the indicator means 140 to indicate that the actuator motor torque has exceeded a predetermined limit less than the maximum permissible amount. The torque limit at which the upper limit switches 100 and 120 are activated is set by the adjustment screws 108 and 128 (FIG. 2) as well as the barrel cam 164. In a typical application, activation of the upper limit switches 100 and 120 occurs anywhere from 30-100% of the maximum torque rating for the actuator. Furthermore, the barrel cam 164 adjustment is independent of the rotational position of the rod 154.

An important feature of the present invention is that the activation of both the upper switches 100 and 120 and of the lower switches 142 and 144 can be adjusted independently of each other and without affecting the adjustment of the other switches. More specifically, the actuation of the lower switches 142 and 144 is accomplished by the rotation of the rod 154 in the hub bore 152 but the rotation of the rod 154 does not change the longitudinal position of the barrel cam 164 on the rod 154 and, thus, does not vary the actuation point of the upper limit switches 100 and 120. Likewise, the rotation of the barrel cam 164 on the rod 154, which simultaneously varies its longitudinal position on the rod 154, varies the actuation point of the upper switches 100 and 120 without altering the actuation setting of the lower switches 142 and 144.

As has been previously described, both the upper limit switches 100 and 120 and the lower switches 142 and 144 are pivotally mounted on their respective housing plates 20 and 22 so that these switches can pivot away from the rod 154. Under certain valve actuation conditions, the actual travel of a shaft extension 36 with its attached rod 154 exceeds the amount necessary to activate these switches. The pivotal mounting of the switches to their housing plates enables these switches to swing away from the rod 154 and protects the switches from permanent damage.

With reference particularly to FIG. 2, the actual travel of the rod 154 is relatively small, for example 0.080 inches. However, the barrel cam 164, in operation, abuts against the switch levers 134 or 136 adjacent their ends 135 most spaced from the actual switch mechanism 137. Thus, a mechanical advantage is obtained so that the actual movement of the switch levers 134 and 136 is much greater than the movement of the rod 154.

From the foregoing, it can be seen that the device according to the present invention provides a unique torque limit indicator for a valve actuator in which the limit switches 100 and 120 can be adjusted by the user to provide an indication to the user when the torque exceeds predetermined limits less than the maximum permissible amount. The activation of the indicating means 140 is thus indicative that maintenance or replacement of the valve assembly is required. Furthermore, the valve assembly can continue to operate despite activation of either switches 100 or 120. Conversely, activation of the switch 142 or 144 disables the valve motor in order to protect the valve components.

The present invention is further advantageous in that it is simple and reliable in construction and relatively inexpensive in construction. Furthermore, the device uses only mechanical components to translate the axial force on the actuator shaft into lateral movement of the rod 154 thus further enhancing the reliability of the device.

Although the device according to the present invention has been described for use with valve actuators, it will be understood that this is by way of description only and that the device according to the present invention can be employed with other kinds of actuators as well as other types of devices.

Having described by invention, however, many modifications thereto will become apparent to those skilled in the art to which it pertains without deviation from the spirit of the invention as defined by the scope of the appended claims.

I claim:

1. For use with an actuator having an actuator shaft, a device for indicating when the torque on said actuator shaft exceeds a limit comprising:

a housing, a limit switch and means for attaching said limit switch to said housing, means movable in an amount proportional to the torque on the actuator shaft, means carried by said movable means for activating said limit switch when said torque exceeds said limit, said activating means including means for varying said limit, means for indicating activation of said limit switch, and wherein said movable means comprises a radially extending member with respect to said actuator shaft, means for converting axial force on said actuator shaft to movement of said member axially with respect to said actuator shaft, said member having a portion positioned adjacent said limit switch.

2. The invention as defined in claim 1 wherein said movable means is movable in an amount and direction proportional to the amount and direction of torque on the shaft, said device comprising a further limit switch mounted to said housing at a position so that said activating means is positioned in between said limit switches.

3. The invention as defined in claim 1 wherein said varying means comprises a cam and means for adjustably securing said cam to said portion of said member.

4. The invention as defined in claim 1 wherein said converting means comprises a shaft extension, means for mounting said shaft extension coaxial with said actuator shaft so that axial force from said actuator shaft is transmitted to said shaft extension and at least one compressible member sandwiched in between one end of said radially extending member and abutment means carried by said shaft extension.

5. The invention as defined in claim 4 and comprising a second compressible member sandwiched in between the other end of said radially extending member and second abutment means carried by said shaft extension.

6. The invention as defined in claim 5 wherein each compressible member comprises at least one Belleville washer.

7. For use with an actuator having an actuator shaft, a device for indicating when the torque on said actuator shaft exceeds a first or second limit comprising:
   a housing,
   a first limit switch and first means for attaching said first limit switch to said housing,
   a second limit switch and second means for attaching said second limit switch to said housing,
   means movable in an amount proportional to the torque on the actuator shaft,
   means carried by said movable means for activating said first limit switch when said torque exceeds said first limit and for activating said second limit switch when said torque exceeds said second limit, said activating means including means for varying said first limit, and
   means for indicating activation of said limit switches.

8. The invention as defined in claim 7 and comprising first means for adjusting said first limit and second means for adjusting said second limit, wherein said first and second adjusting means are independently adjustable with respect to each other.

9. The invention as defined in claim 7 wherein said first attaching means comprises first means for pivotally mounting said first limit switch to said housing between a first and a second pivotal position, first means for urging said first limit switch towards its first pivotal position, and wherein said second attaching means comprises secnd means for pivotally mounting said second limit switch to said housing between a first and second pivotal position, and second means for urging said second limit switch towards its first pivotal position.

10. For use with an actuator having an actuator shaft, a device for indicating when the torque on said actuator shaft exceeds a limit comprising:
    a housing,
    a limit switch and means for attaching said limit switch to said housing,
    means movable in an amount proportional to the torque on the actuator shaft,
    means carried by said movable means for activating said limit switch when said torque exceeds said limit, said activating means including means for varying said limit,
    means for indicating activation of said limit switch, and
    wherein said attaching means comprises means for pivotally mounting said limit switch to said housing between a first and a second pivotal position and means for urging said limit switch towards its first pivotal position.

11. For use with an actuator having an actuator shaft, a device for indicating when the torque on said actuator shaft exceeds a limit comprising:
    a housing,
    a limit switch and means for attaching said limit switch to said housing,
    means movable in an amount proportional to the torque on the actuator shaft,
    means carried by said movable means for activating said limit switch when said torque exceeds said limit, said activating means including means for varying said limit, and
    means for indicating activation of said limit switch,
    a shaft extension coaxially secured to said shaft against axial movement and,
    wherein said movable means comprises a hub secured to said shaft extension, a first compressible member slidably mounted to said shaft extension and sandwiched between one end of said hub and said housing, a second compressible member slidably mounted to said shaft extension and sandwiched between the other end of said hub and said housing.

12. The invention as defined in claim 11 wherein each compressible member comprises at least one Belleville washer.

* * * * *

UNITED STATES PATENT AND TRADEMARK OFFICE
CERTIFICATE OF CORRECTION

PATENT NO. : 4,454,504
DATED : June 12, 1984
INVENTOR(S) : Armin Jocz

It is certified that error appears in the above—identified patent and that said Letters Patent is hereby corrected as shown below:

Claim 9, line 34 delete "secnd" insert --second--.

Signed and Sealed this

Fourth Day of December 1984

[SEAL]

Attest:

GERALD J. MOSSINGHOFF

Attesting Officer  Commissioner of Patents and Trademarks